United States Patent
Gerhard et al.

(10) Patent No.: US 10,171,009 B2
(45) Date of Patent: Jan. 1, 2019

(54) APPARATUS AND METHOD FOR LIFTING OBJECTS

(71) Applicant: Siemens Aktiengesellschaft, Munich (DE)

(72) Inventors: Detlef Gerhard, Munich (DE); Martin Renner, Unterhaching (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 482 days.

(21) Appl. No.: 14/897,349

(22) PCT Filed: May 21, 2014

(86) PCT No.: PCT/EP2014/060387
§ 371 (c)(1),
(2) Date: Dec. 10, 2015

(87) PCT Pub. No.: WO2014/202315
PCT Pub. Date: Dec. 24, 2014

(65) Prior Publication Data
US 2016/0134203 A1  May 12, 2016

(30) Foreign Application Priority Data
Jun. 17, 2013 (DE) .................. 10 2013 211 289

(51) Int. Cl.
*H01L 41/09* (2006.01)
*H01L 41/08* (2006.01)
(Continued)

(52) U.S. Cl.
CPC ............. *H02N 2/043* (2013.01); *H02N 2/02* (2013.01)

(58) Field of Classification Search
CPC .......... H02N 2/043; H02N 2/02; H01L 41/08; H01L 41/09
(Continued)

(56) References Cited

U.S. PATENT DOCUMENTS

| 5,055,733 A | 10/1991 | Eylman ......................... 310/328 |
| 6,784,599 B1 | 8/2004 | Stoecklein et al. ........... 310/364 |

FOREIGN PATENT DOCUMENTS

| CN | 202818151 U | 3/2013 | ............... H02N 2/00 |
| DE | 19830746 B4 | 1/2004 | ............. B66C 13/18 |

(Continued)

OTHER PUBLICATIONS

Chinese Office Action, Application No. 201480034057.1, 6 pages, dated Jan. 16, 2017.
(Continued)

*Primary Examiner* — Thomas Dougherty
(74) *Attorney, Agent, or Firm* — Slayden Grubert Beard PLLC

(57) ABSTRACT

A device and a method for moving an object in a vertical direction are disclosed. The device includes a plurality of piezo-actuators expanding in directions upon activation and in doing so generating pressure forces on an active side, and a hydraulic transmission device that converts the pressure forces of the piezo-actuators into a vertical pressure force for moving the object opposite the direction of gravity and transmits the pressure force with a transmission ratio. The object is lifted after the vertical pressure force has exceeded an oppositely acting spring force of a spring system.

18 Claims, 2 Drawing Sheets

(51) Int. Cl.
*H02N 2/04* (2006.01)
*H02N 2/02* (2006.01)

(58) Field of Classification Search
USPC .................................................. 310/311, 328
See application file for complete search history.

(56) References Cited

FOREIGN PATENT DOCUMENTS

| | | | |
|---|---|---|---|
| DE | 19717142 B4 | 7/2004 | ............. B25J 13/08 |
| DE | 102006025177 A1 | 12/2007 | ............. F02M 51/06 |
| DE | 102009040411 A1 | 3/2011 | ............. B60R 21/34 |
| DE | 102010024577 A1 | 12/2011 | ............. H02N 2/02 |
| DE | 102010025149 A1 | 12/2011 | ............. H02N 2/02 |
| GB | 2087659 A | 5/1982 | ............. F04B 17/00 |
| JP | 63314376 A | 12/1988 | ............. F04B 17/00 |
| JP | 04331834 A | 11/1992 | ............. B60K 5/12 |
| JP | 2000314402 A | 11/2000 | ............. F15B 7/00 |
| JP | 2002035696 A | 2/2002 | ............. B06B 1/06 |
| JP | 2012050309 A | 3/2012 | ............. H02N 2/00 |
| WO | 00/79611 A1 | 12/2000 | ........... H01L 41/053 |
| WO | 2014/202315 A1 | 12/2014 | ............. H02N 2/04 |

OTHER PUBLICATIONS

Japanese Office Action, Application No. 2016520339, 5 pages, dated Jan. 23, 2017.
German Office Action, Application No. 102013211289.0, 5 pages, dated Mar. 27, 2014.
International Search Report and Written Opinion, Application No. PCT/EP2014/060387, 10 pages, dated Sep. 16, 2014.

APPARATUS AND METHOD FOR LIFTING OBJECTS

CROSS-REFERENCE TO RELATED APPLICATIONS

This application is a U.S. National Stage Application of International Application No. PCT/EP2014/060387 filed May 21, 2014, which designates the United States of America, and claims priority to DE Application No. 10 2013 211 289.0 filed Jun. 17, 2013, the contents of which are hereby incorporated by reference in their entirety.

TECHNICAL FIELD

The present invention relates to an apparatus and a method for moving an object in the vertical direction.

BACKGROUND

In order to lift and position loads, for example a chuck, relatively accurately, use is made of drives which are intended to position the load or the object rapidly and accurately.

Conventionally, use has been made of spindle drives and, especially for smaller loads, piezo drives with articulated transmission. For positioning movements, first piezo drives having hydraulic stroke transmission are known as internal prior art. Internally, multistage hydraulic transmissions have already been used, wherein a plurality of drives are connected in parallel to lift the objects, in order in this way to be able to position the object mass in a correspondingly rapid manner. This internal prior art has the disadvantage, however, that the individual drives have to be synchronized precisely with one another. A further disadvantage is that, likewise with precise adjustment on account of manufacturing tolerances, uniform lifting of the piezo hydraulic systems connected in parallel can be realized only with great difficulty.

SUMMARY

One embodiment provides an apparatus for moving an object in a vertical direction, having a plurality of piezo actuators that expand in directions upon activation and in the process generate pressure forces on an active side; and a hydraulic transmission device which converts the pressure forces of the piezo actuators into a vertical pressure force for moving the object counter to the direction of gravity and transmits said pressure forces with a transmission ratio.

In a further embodiment, a spring system acts between the object to be moved and the hydraulic transmission device with its spring force counter to the vertical pressure force of the hydraulic transmission device.

In a further embodiment, the hydraulic transmission device has in each case a movable piezo actuator bellows on the active side of each piezo actuator, all of said piezo actuator bellows containing a common fluid which is transportable by means of a line system to and into a vertically movable central bellows that provides the vertical pressure force.

In a further embodiment, the line system connects line portions extending out of the piezo actuator bellows to a common vertical line to the central bellows.

In a further embodiment, the piezo actuators, the piezo actuator bellows, the line system and the central bellows are configured symmetrically to a vertical main axis of symmetry of the common vertical line.

In a further embodiment, the piezo actuators extend substantially along two horizontal planes in a manner located congruently on one another, and in particular four piezo actuators are formed.

In a further embodiment, the piezo actuators are fixed with the associated piezo actuator bellows between an outer retaining sleeve and an inner retaining sleeve, said retaining sleeves being rotationally symmetrical to the vertical main axis of symmetry, wherein the line portions extending out of the piezo actuator bellows extend horizontally and through the inner retaining sleeve.

In a further embodiment, the spring system has a substantially horizontally extending first spring element which is mounted on an upper planar end of the inner retaining sleeve, wherein the inner retaining sleeve is higher than the outer retaining sleeve.

In a further embodiment, the object to be moved rests on an upper planar end of a main retaining sleeve that is rotationally symmetrical to the vertical main axis of symmetry, said main retaining sleeve comprising and being fixed to the first spring element under the object to be moved.

In a further embodiment, the spring system has a substantially horizontally extending second spring element which is mounted beneath the piezo actuators by means of the inner retaining sleeve and is comprised by and fixed to the main retaining sleeve.

In a further embodiment, the first and/or the second spring element is/are rotationally symmetrical to the vertical main axis of symmetry and is/are in particular spring rings/a spring ring, in particular chrome spring rings/a chrome spring ring or diaphragm springs/a diaphragm spring.

In a further embodiment, the central bellows transfers the vertical pressure force to the first spring element by means of a stroke transfer element arranged between said central bellows and the first spring element, in particular by means of a bracket symmetrical to the vertical main axis of symmetry.

In a further embodiment, the object to be moved is a chuck plate or carrier plate.

In a further embodiment, for activation, the piezo actuators are controllable individually and in a combinable manner by means of a control device.

Another embodiment provides a method for moving an object in a vertical direction by means of a device according to one of the preceding claims, having the steps of activating a plurality of piezo actuators that expand in directions and in the process generate pressure forces on an active side; and moving the object counter to the direction of gravity by means of converting and transmitting the pressure forces of the piezo actuators into a vertical pressure force by means of a hydraulic transmission device.

In a further embodiment, a spring system acts between the object to be moved and the hydraulic transmission device with its spring force counter to the vertical pressure force of the hydraulic transmission device.

In a further embodiment, the hydraulic transmission device has in each case a movable piezo actuator bellows on the active side of each piezo actuator, wherein all of the piezo actuator bellows contain a common fluid which is transportable by means of a line system to and into a vertically movable central bellows that provides the vertical pressure force.

In a further embodiment, the central bellows transfers the vertical pressure force to the first spring element by means of a stroke transfer element arranged between said central bellows and the first spring element, in particular by means of a bracket symmetrical to the vertical main axis of symmetry.

In a further embodiment, for activation, the piezo actuators are controlled individually and in a combinable manner by means of a control device.

Another embodiment provides using an apparatus or method as disclosed above to move an object having a mass of 100 to 1000 g in a vertical direction counter to the direction of gravity with a stroke of 0.5 to 5 mm within 1 to 10 ms with a positioning inaccuracy of less than 10 µm.

BRIEF DESCRIPTION OF THE DRAWINGS

Embodiments of the invention are described in more detail below with reference to the figures, in which.

DETAILED DESCRIPTION

Figure 1:
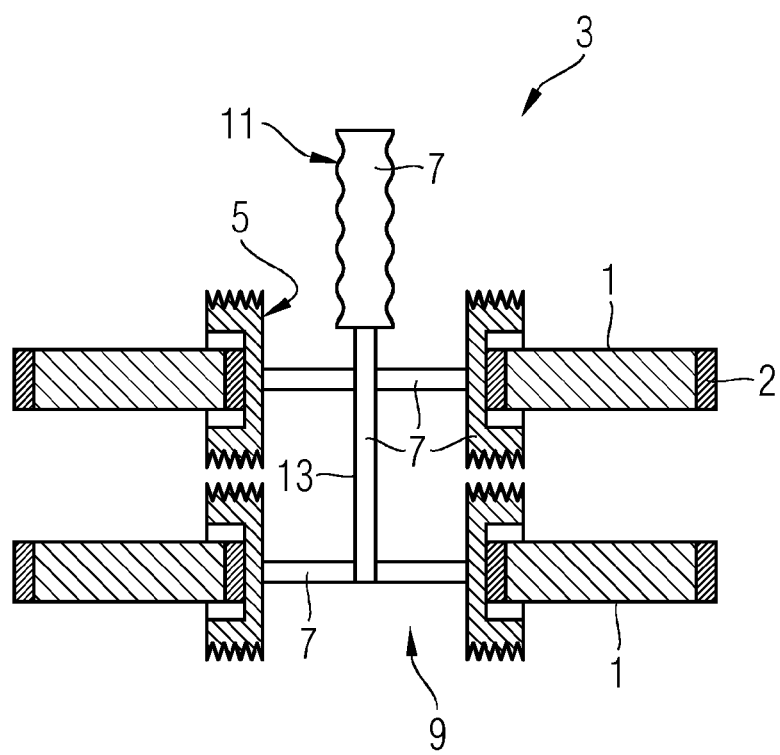
FIG. 1 shows a first exemplary embodiment of an apparatus according to the invention.

Embodiments of the present invention provide an apparatus and a method for moving an object in a vertical direction, in particular counter to the direction of gravity, such that objects can be lifted rapidly with a small stroke and precisely. For example, masses in the range from 50 g to 1000 g are intended to be lifted in the ms range with great positioning accuracy. For example, objects having a mass in the range from 100 g to 1000 g are intended to be able to be lifted by about 0.5 to 5 mm in about 5 ms with a positioning accuracy of better than 10 µm. In particular, the adjustment of the apparatus is intended to be simple and the probability of the object tipping is intended to be effectively reduced.

Some embodiments provide an apparatus for moving an object in a vertical direction, the apparatus having a plurality of piezo actuators that expand in directions upon activation and in the process generate pressure forces on an active side, and a hydraulic transmission device which converts the pressure forces of the piezo actuators into a vertical pressure force for moving the object counter to the direction of gravity and transmits said pressure forces with a transmission ratio.

A transmission ratio indicates a factor by which the pressure forces are converted into a vertical pressure force. This factor results for example from a quotient, an output cross-sectional area divided by an input cross-sectional area.

Other embodiments provide a method for moving an object in a vertical direction, having the steps of activating a plurality of piezo actuators that expand in directions and in the process generate pressure forces on an active side, and moving the object counter to the direction of gravity by means of converting and transmitting the pressure forces of the piezo actuators into a vertical pressure force by means of a hydraulic transmission device.

Piezo actuators having at least one single-stage hydraulic stroke transmission are used. By means of a method according to the invention, the stroke of a plurality of piezo actuators is passed on to the object via a common hydraulic system, in order in this way to lift the object. According to the invention, a plurality of piezo actuators, which can be combined with one another as desired and jointly use a hydraulic stroke transmission, are used.

Further advantageous configurations are claimed in connection with the dependent claims.

According to one embodiment, a spring system can act between the object to be moved and the hydraulic transmission device with its spring force counter to the vertical pressure force of the hydraulic transmission device. Accordingly, the stroke of a plurality of piezo actuators is passed on to the spring system via a common hydraulic system, in order to lift the object.

According to a further embodiment, the hydraulic transmission device can have in each case a movable piezo actuator bellows on the active side of each piezo actuator, wherein all of the piezo actuator bellows contain a common fluid which is transportable by means of a line system to and into a vertically movable central bellows that provides the vertical pressure force.

According to a further embodiment, the line system can connect line portions extending out of the piezo actuator bellows to a common vertical line to the central bellows.

According to a further embodiment, the piezo actuators, the piezo actuator bellows, the line system and the central bellows can be configured symmetrically to a vertical main axis of symmetry of the common vertical line.

According to a further embodiment, the piezo actuators can extend substantially along two horizontal planes in a manner located congruently on one another, and in particular four piezo actuators can be formed.

According to a further embodiment, the piezo actuators can be fixed with the associated piezo actuator bellows between an outer retaining sleeve and an inner retaining sleeve, said retaining sleeves being rotationally symmetrical to the vertical main axis of symmetry, wherein the line portions extending out of the piezo actuator bellows extend horizontally and through the inner retaining sleeve.

According to a further embodiment, the spring system can have a substantially horizontally extending first spring element which is mounted on an upper planar end of the inner retaining sleeve, wherein the inner retaining sleeve is higher than the outer retaining sleeve.

According to a further embodiment, the object to be moved can rest on an upper planar end of a main retaining sleeve that is rotationally symmetrical to the vertical main axis of symmetry, said main retaining sleeve comprising and being fixed to the first spring element under the object to be moved.

According to a further embodiment, the spring system can have a substantially horizontally extending second spring element which is mounted beneath the piezo actuators by means of the inner retaining sleeve and is comprised by and fixed to the main retaining sleeve.

According to a further embodiment, the first and the second spring element can be rotationally symmetrical to the vertical main axis of symmetry and be in particular spring rings, in particular chrome spring rings or diaphragm springs.

According to a further embodiment, the central bellows can transfer the vertical pressure force to the first spring element by means of a stroke transfer element arranged between said central bellows and the first spring element, in particular by means of a bracket symmetrical to the vertical main axis of symmetry.

According to a further embodiment, the object to be moved can be a chuck plate or carrier plate.

According to a further embodiment, for activation, the piezo actuators can be controllable individually and in a manner combinable as desired by means of a control device.

FIG. 1 shows a first exemplary embodiment of an apparatus according to the invention. A plurality of piezo actuators 1 that expand in horizontal directions upon activation and in the process generate pressure forces on an active side are illustrated. These piezo actuators 1 are in this case enclosed, or arranged in a housing 2. A hydraulic transmission device 3 converts the pressure forces of the piezo actuators 1 into a vertical pressure force for moving the object counter to the direction of gravity. The hydraulic transmission device 3 has in each case a movable piezo actuator bellows 5 on the active side of each piezo actuator 1, wherein all of the piezo actuator bellows 5 contain a common fluid 7 which is transportable, upon activation, by means of a line system 9 to and into a vertically movable central bellows 11 that provides the vertical pressure force. The line system 9 connects line portions extending horizontally out of the piezo actuator bellows 5 to a common vertical line, which extends into the central bellows.

The piezo actuators 1, the piezo actuator bellows 5, the line system 9 and the central bellows 11 are formed symmetrically to a vertical main axis of symmetry of the common vertical line 13. According to the embodiment according to FIG. 1, the piezo actuators 1 extend substantially along two horizontal planes in a manner located congruently on one another. For example, four piezo actuators 1 can be provided. FIG. 1 shows a piezo actuator system having a hydraulic transmission.

Figure 2:
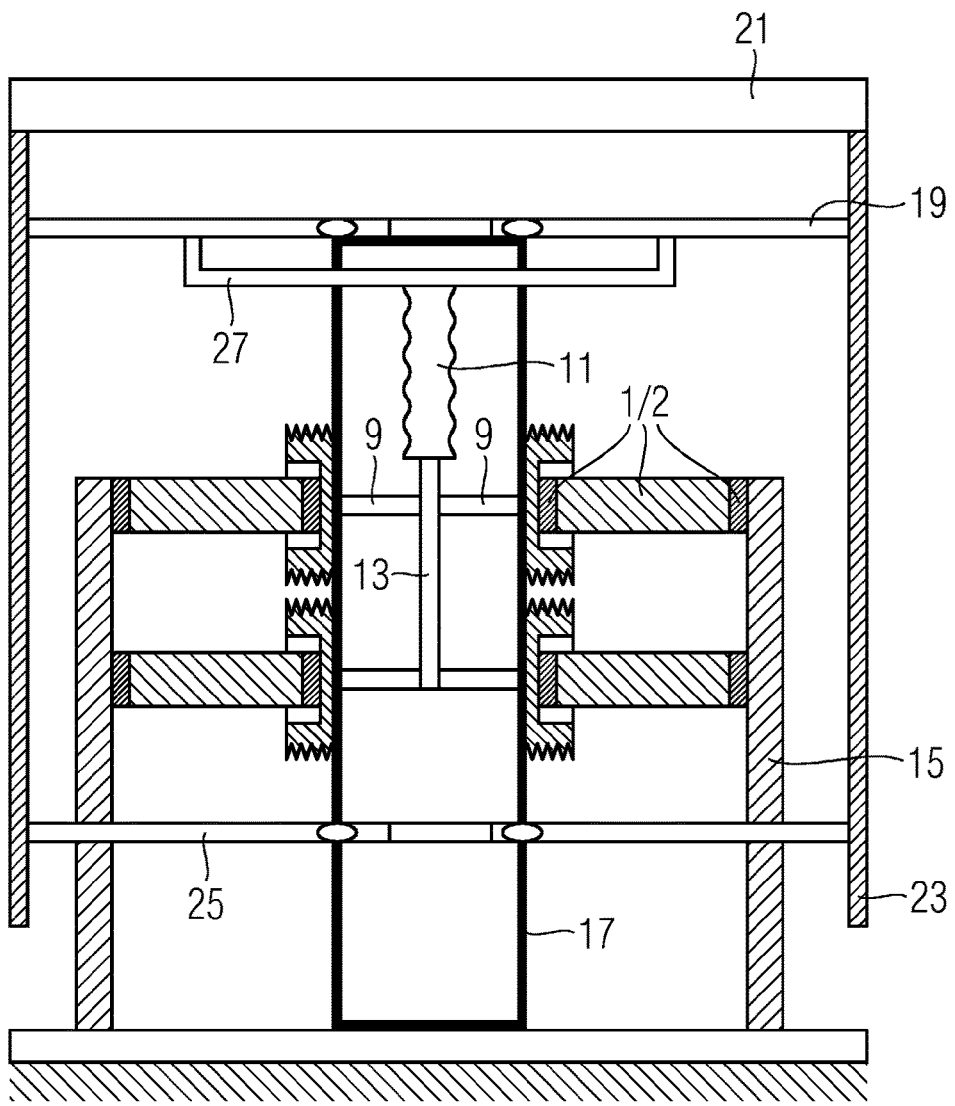
FIG. 2 shows a second exemplary embodiment of an apparatus according to the invention.

FIG. 2 shows a second exemplary embodiment of an apparatus according to the invention. In this case, the constituents of FIG. 1 are contained in full in the illustration according to FIG. 2. Identical reference signs denote identical structural features. According to FIG. 2, the piezo actuators 1 are fixed with the respectively associated piezo actuator bellows 5 between an outer retaining sleeve 15 and an inner retaining sleeve 17, said retaining sleeves 15, 17 being rotationally symmetrical to a vertical main axis of symmetry of the common vertical line 13. The line portions extending out of the piezo actuator bellows 5 extend horizontally and pass through the inner retaining sleeve 17. The spring system has a substantially horizontally extending first spring element 19 which is mounted on an upper end of the inner retaining sleeve 17, wherein the inner retaining sleeve 17 is higher than the outer retaining sleeve 15. The object to be moved is in this case a support plate 21 which rests on an upper end of a main retaining sleeve 23 that is rotationally symmetrical to the vertical main axis of symmetry, said main retaining sleeve 23 comprising and being fixed to the first spring element 19 under the object to be moved. In addition, the spring system has a substantially horizontally extending second spring element 25 which is mounted beneath the piezo actuators 1 by means of the inner retaining sleeve 17 and is comprised by and fixed to the main retaining sleeve 23. The first and the second spring element 19, 25 are embodied here as spring rings. Alternatively, the spring elements can be embodied as diaphragm springs. The central bellows 11 transfers the vertical pressure force to the first spring element 19 by means of a bracket 27, symmetrical to the vertical main axis of symmetry, arranged between the central bellows 11 and the first spring element 19. The piezo actuators 1 are controllable individually and in a combinable manner by means of a control device for the activation. Alternatively, the support plate 21 can be a chuck plate. The spring rings of the first spring element 19 and of the second spring element 25 effect a guided deflection counter to the direction of gravity upon activation of the piezo actuators. The bracket 27 allows uniform stroke transfer between the central bellows 11 and the spring ring of the first spring element 19. The central bellows 11 filled with the fluid 7 can act as a hydraulic transmitter. The horizontal lines and the vertical line 13 allow the fluid 7 to be transported between the piezo actuator bellows 5 and the central bellows 11. The piezo actuators 1 can each be enclosed. The retaining sleeves can likewise be embodied as retaining rings. Inner spring element mountings can be provided by means of the inner retaining sleeves 17. The main retaining sleeve 23 can be used as a holder for the first spring element 19 and the second spring element 25 and the carrier plate 21. FIG. 2 shows a vertical drive for example for a chuck plate. The latter can be used for example when manufacturing electronic components and appliances.

Figure 3:
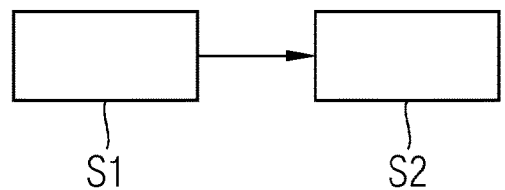
FIG. 3 shows an exemplary embodiment of a method according to the invention.

FIG. 3 shows an exemplary embodiment of a method according to the invention. In a first step S1, a plurality of piezo actuators that expand in directions and in the process generate pressure forces on an active side are activated. In a second step S2, an object is moved counter to the direction of gravity by means of converting and transmitting the pressure forces of the piezo actuators into a vertical pressure force by means of a hydraulic transmission device. In order to provide guided deflection, the vertical pressure force of the hydraulic transmission device acts counter to a spring system. Thus, the object is lifted rapidly, since the vertical lifting pressure force is greater than the opposing spring force of the spring system. When a corresponding threshold value is exceeded, the object is lifted at great speed.

The present invention relates to an apparatus and a method for moving an object in a vertical direction, having a plurality of piezo actuators 1 that expand in directions upon activation and in the process generate pressure forces on an active side, and a hydraulic transmission device 3 which converts the pressure forces of the piezo actuators into a vertical pressure force for moving the object counter to the direction of gravity and transmits said pressure forces with a transmission ratio. The object is lifted since the vertical pressure force has exceeded an opposing spring force of a spring system.

What is claimed is:

1. An apparatus for lifting an object, comprising:
   a plurality of piezo actuators that expand in directions upon activation to thereby generate pressure forces on an active side of each piezo actuator;
   a hydraulic transmission device configured to:
      convert the pressure forces of the piezo actuators into a vertical pressure force to move the object in a direction counter to a direction of gravity; and
      transmit said converted pressure forces with a transmission ratio; and
   a spring system connected between the object and the hydraulic transmission device, the spring system providing a spring force counter to the vertical pressure force of the hydraulic transmission device.

2. An apparatus for lifting an object, comprising:
   a plurality of piezo actuators that expand in directions upon activation to thereby generate pressure forces on an active side of each piezo actuator; and
   a hydraulic transmission device configured to:
      convert the pressure forces of the piezo actuators into a vertical pressure force to move the object in a direction counter to a direction of gravity; and
      transmit said converted pressure forces with a transmission ratio;
   wherein the hydraulic transmission device includes:
      a movable piezo actuator bellows on the active side of each piezo actuator, wherein the piezo actuator bellows contain a common fluid; and a line system configured to transport the common fluid to and into a vertically movable central bellows that provides the vertical pressure force.

3. The apparatus of claim 2, wherein the line system connects line portions extending out of the piezo actuator bellows to a common vertical line connected to the central bellows.

4. The apparatus of claim 3, wherein the piezo actuators, the piezo actuator bellows, the line system, and the central bellows are configured symmetrically with respect to a vertical axis of symmetry of the common vertical line.

5. The apparatus of claim 4, comprising four piezo actuators arranged in two opposing pairs extending in two horizontal planes.

6. The apparatus of claim 4, wherein the piezo actuators and piezo actuator bellows are fixed between an outer retaining sleeve and an inner retaining sleeve, wherein said retaining sleeves are rotationally symmetrical to the vertical main axis of symmetry, and wherein the line portions extending out of the piezo actuator bellows extend horizontally and through the inner retaining sleeve.

7. The apparatus of claim 6, further comprising a spring system includes a horizontally extending first spring element mounted on an upper planar end of the inner retaining sleeve, wherein the inner retaining sleeve extends vertically higher than the outer retaining sleeve.

8. The apparatus of claim 7, wherein the object rests on an upper planar end of a main retaining sleeve that is rotationally symmetrical to the vertical main axis of symmetry, said main retaining sleeve being fixed to the first spring element under the object.

9. The apparatus of claim 8, wherein the spring system includes a horizontally extending second spring element mounted beneath the piezo actuators by the inner retaining sleeve and is fixed to the main retaining sleeve.

10. The apparatus of claim 7, wherein at least one of the first spring element or the second spring element comprises a spring ring that is rotationally symmetrical to the vertical main axis of symmetry.

11. The apparatus of claim 7, wherein the central bellows transfers the vertical pressure force to the first spring element via a stroke transfer element arranged between said central bellows and the first spring element, the stroke transfer element comprising a bracket symmetrical to the vertical main axis of symmetry.

12. The apparatus of claim 1, wherein the object is a chuck plate or a carrier plate.

13. The apparatus of claim 1, wherein the piezo actuators are controllable individually and in a combinable manner by a control device.

14. A method for lifting an object, of the method comprising:
   activating a plurality of piezo actuators that expand in directions to thereby generate pressure forces on an active side of each piezo actuator; and
   moving the object in a direction counter to a direction of gravity by converting and transmitting the pressure forces of the piezo actuators into a vertical pressure force via a hydraulic transmission device;
   wherein the hydraulic transmission device includes a movable piezo actuator bellows on the active side of each piezo actuator, wherein all of the piezo actuator bellows contain a common fluid which is transported by a line system to and into a vertically movable central bellows that provides the vertical pressure force.

15. The method of claim 14, wherein a spring system acts between the object and the hydraulic transmission device, with a spring force of the spring system acting counter to the vertical pressure force of the hydraulic transmission device.

16. The method of claim 14, wherein the central bellows transfers the vertical pressure force to a first spring element by a stroke transfer element arranged between said central bellows and the first spring element, the stroke transfer element comprising a bracket symmetrical to the vertical main axis of symmetry.

17. The method of claim 14, comprising using a control device to control the piezo actuators individually and in a combinable manner.

18. The method of claim 14, wherein the object has a mass of 100 to 1000 g, and wherein the method comprises lifting the object with a stroke of 0.5 to 5 mm within 1 to 10 ms with a positioning inaccuracy of less than 10 μm.

* * * * *